May 15, 1962           F. ZANDMAN           3,034,395
PHOTOELASTIC TESTING AND MEASUREMENT OF MECHANICAL STRAINS
Original Filed April 2, 1957
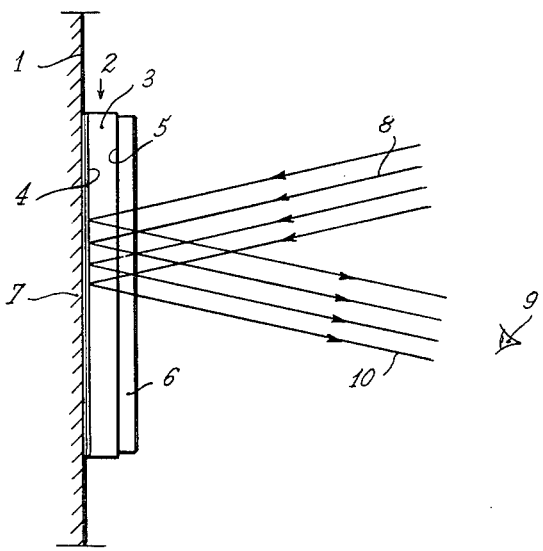
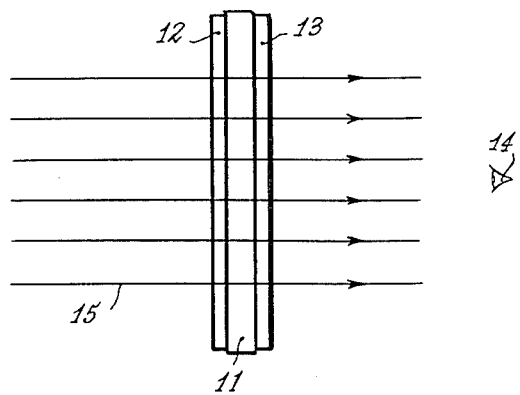
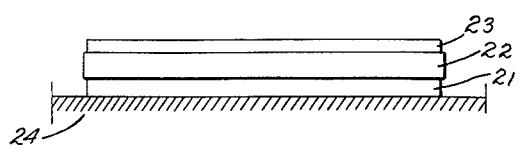
INVENTOR
FELIX ZANDMAN
BY Darby & Darby
ATTORNEYS 3,034,395
PHOTOELASTIC TESTING AND MEASUREMENT
OF MECHANICAL STRAINS
Felix Zandman, Rosemont, Pa., assignor, by mesne assignments, to The Budd Company, Philadelphia, Pa., a corporation of Pennsylvania
Continuation of application Ser. No. 650,250, Apr. 2, 1957. This application Dec. 22, 1960, Ser. No. 72,838
Claims priority, application France Nov. 26, 1956
7 Claims. (Cl. 88—14)

This application is a continuation of pending application Serial Number 650,250, now abandoned, filed April 2, 1957, and assigned to the same assignee as is this application.

This invention relates to a system for detecting the strains to which mechanical parts are subjected. The system comprises two plates or sheet elements bonded face to face, one of which is so-called photoelastic element, i.e., is adapted to acquire birefringent characteristics when distorted, and the other of which is made of polarizing material.

The term "photoelastic material" as used herein refers to material which exhibits changes in optical properties when subjected to stresses, i.e., when in the unstressed condition these are isotropic and become anisotropic when stressed. Those materials are usually isotropic, transparent or translucent, dielectric materials which are generally long-chain polymers and include, but are not limited to, epoxy resins, i.e., resins having the general chemical formula:

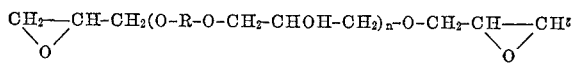

wherein R represents an aromatic group, polyvinyl acetate, cellulose sheet material, polymers of methyl methacrylate, polyesters, urea-formaldehyde and melamine-formaldehyde resins, and gelatins. The photoelastic element may be bonded to the adjacent layer of material by suitable known light-transmitting adhesives compatible with the materials to be bonded, or in some instances, by softening one or both of the materials as by a solvent or by heating to render it or them adhesive. Some photoelastic materials may become unitarily bonded to the adjacent surface when initially deposited in liquid condition, followed by solidification at ordinary temperatures. The photoelastic plate may be of the kind produced e.g., by Société Photostress, 74 rue Blanche, Paris, France, or may comprise any suitable substance possessing birefringency.

The other sheet or plate bonded thereto may be made either from a linearly or a circularly polarizing material depending on the particular use to which the system is to be put.

The polarizing material may constitute a plate bonded to the photoelastic plate, or it may comprise a film coated over said plate by any suitable coating or laminating process. A sheet element of the type sold by the Polaroid Corporation may be used, it being bonded adhesively or otherwise to the photoelastic plate.

The resulting dual system may be produced in laminates of large surface area and the detecting units or strain gauges of the invention may then be produced by cutting the laminate to the desired shapes and sizes depending on the uses contemplated therefor.

A unit according to the invention is adapted to be bonded to the part wherein the mechanical strains are to be detected, monitored or measured. Such detection, supervision or measurement does not require the use of any additional measuring instrument. It simply requires ordinary illumination which may be very low intensity, and visual observation with the unaided eye, or if desired a photoelectric cell may be substituted for the observer's eye where the achievement of some control effect is desired. Surface deformations of the part being investigated are transmitted to the photoelastic plate bonded to it, and the plate becomes birefringent as a result of the deformation. The illuminating light rays become polarized on passing through the polarizing element bonded to the plate and hence are modified on passing through the birefringent plate to an extent depending on the deformation of said plate, and the resulting modification is apparent since the reflected light is viewed through the polarizing element acting as an analyzer.

A unit according to the invention may be adhesively bonded to the mechanical part to be investigated. If the part has a metallic surface it will serve as a reflector, so that the incident rays which have passed through the polarizer and the photoelastic strip are reflected from the part and traverse a second time the photoelastic strip and the polarizer which this time serves as an analyzer.

If on the other hand the part under test is not reflective in character, a reflected coating may be provided thereon as by spraying or otherwise bonding a coat of aluminum paint. Where such procedure is impractical owing to the surface character of the part, the face of the unit of the invention which is to be bonded to the part, may be made reflective as by metal coating.

In one form of embodiment, the polarizer strip bonded to the photoelastic plate is linearly polarizing.

In a modified embodiment said strip is circularly polarizing. This modification is desirable in those cases where the directions to which the main stresses are exerted in the part under investigation are not known in advance; the unit will then make color patterns visible regardless of the orientation of said directions.

The rectilinear or circular polarizer may have an additional birefringent plate associated with it, such as an element of the so-called "sensitive hue" type, in order to enhance the sensitivity of the readings. Such a plate may then be bonded to the photoelastic plate and then have the polarizer superimposed over it.

In one constructional form mentioned by way of example, a unit or system according to the invention may comprise, bonded to a photoelastic plate, a rectilinear polarizing plate, sheet, or strip form, and a cellophane sheet element of conventional commercial type, the cellophane element being so arranged as to have its axis lying substantially at an angle of 45° to the axis of the linear polarizer. Such a system may desirably be used in cases where the directions of the main stresses in the test piece are known in advance, at any rate to some approximation. Such a situation is had where the test piece is a girder or similar elongated structural element. The composite unit may then be bonded to the test piece in such a manner that any deformation of the testpiece will be transmitted to the photoelastic plate. Any strains developed in the testpiece, even minutely low ones, will then cause the sensitive hue to change from blue to red or vice versa.

In the application of the invention to the supervision of mechanical or structural parts, the thickness and sensitivity of the photoelastic plate should be so selected that the system will display a predetermined characteristic color hue as the strain in the part attains a predetermined limiting value selected as a limit of safety. Merely by visually observing the device without any additional instrumentation will then warn an observer when the danger point has been reached. The observer may be an unskilled operator, the only and obvious requirement being that he be free of blue-red color-blindness.

Such composite units may be bonded to practically any kind of material, steel, aluminum, cast iron, wood, concrete, stone, etc. Any deformation of a dangerous character, generally a plastic deformation, any crack or other irreversible phenomenon occurring in the material will thus be detectable. The strain-detecting photo-elastic plates of the invention may remain bonded to their supports to fulfill their indicating or monitoring function with respect thereto over very long periods of time.

Whenever it may be desired to perform a strain test using the so-called photoelastic varnish technique, by means of viewing apparatus separate from the composite plate of the invention, this will simply require removal of the overlying polarizing strip from the assembly.

The invention will be better understood from a consideration of the following description in conjunction with the accompanying drawings, illustrating various embodiments of the invention;

FIG. 1 is a side elevation of a preferred embodiment;
FIG. 2 is a second embodiment in side elevation;
FIG. 3 is a third embodiment in side elevation.

In FIG. 1 of the accompanying diagrammatic drawings, the structure, component or part to be tested or supervised is indicated at 1. The assembly of the invention generally designated 2 comprises a transparent photoelastic plate 3 having its face 4 bonded to the part 1. The plate 3 has a strip 6 of polarizing material bonded to its opposite face 5. If the surface of part 1 is not naturally reflective in character, the face 4 may be metal-coated as indicated at 7. The assembly is illuminated with incident light rays indicated by the arrow 8 and for effecting an observation or test the observer's eye indicated at 9 is positioned in the path of the light rays 10 reflective from the bright surface of the supporting part 1 or the metal-coated face 4 as the case may be.

A composite assembly according to the invention comprising a photoelastic plate and an overlying polarizing element can thus be used for any conventional photoelasticity tests such as model stress analysis. The plate will then be cut out in accordance with the contour which is to serve as the model; thus the model will in this case comprise both the photoelastic material and the measuring means, namely the polarizing material, incorporated in a single mechanically unitary assembly. The rear face of the composite assembly would then be metallized or coated with reflective paint.

The invention further includes a form of embodiment in which the photoelectric plate instead of being bonded with a sheet of polarizing material is bonded with two sheets of such material on opposite sides of it so as to provide a sandwich-like structure. Such an assembly will be viewable in transparency rather than reflection, and may serve for such purposes as the determination of the directions of the main strains by observing the isoclinic fringe lines therein, and determinations of the values of strain by observing the isochromatic lines. The two polarizers used may include two linear or two circular polarizers, having their axes parallel or at right angles, thereby providing a means of performing the various conventional photoelastical tests without requiring any auxiliary measuring apparatus.

FIG. 2 illustrates an assembly comprising a transparent photoelastic plate 11 having a sheet 12 of polarizing material bonded to one of its sides and another sheet 13 of polarizing material bonded to its other side. With this embodiment of the invention tests are performed by observing, as indicated by an observer's eye shown at 14, the light rays 15 traversing the assembly.

FIG. 3 illustrates an assembly in which a transparent photoelastic plate 21 has a uniformly birefringent film 22 secured to it, over which polarizer 23 is in turn bonded. This unitary assembly may be used to determine stresses in base 24.

By way of further explanation, the birefringent film 22 may be considered as producing a bias-birefringence which is added algebraically to any forced-birefringence produced in the photoelastic plate 21 in accordance with externally applied deformations.

The conventional theories of birefringence describe light rays as being resolved by birefringent materials into two mutually plane polarized component rays, an ordinary ray and an extraordinary ray. The ordinary ray obeys Snell's law of refraction while the extraordinary ray may travel faster or slower than the ordinary ray, depending upon the characteristics of a specific material. In materials which are birefringent in the absence of external deformation the planes of polarization of the component rays contain the optic axes of the material. In forced-birefringent photoelastic materials, the planes of polarization of the component rays are respectively parallel with the maximum and minimum stress directions normal to the direction of light propagation.

If the material is isotropic, the component rays travel at the same velocity; if the material is anisotropic or becomes anisotropic under stress, the component rays travel through the material at different velocities. Velocity differences cause a relative retardation of one ray with respect to the other and a shift of their phase positions. The total relative retardation upon emergence of the light from the material is a measure of the total birefringence of the material. If the light path is through areas of bias birefringence and of forced birefringence, the relative retardation of the former is added to, or subtracted from, the relative retardation of the latter.

The relative retardation due to a biasing element, such as birefringent film 22, is a constant of the material selected. The relative retardation due to deformation of a forced-birefringent element, such as photoelastic plate 21, is equal to the product of a constant of the material and the principal stress difference enforced upon the material. Total relative retardation is the algebraic sum of these two factors and may be written as: $r = b + a(p-q)$; where, for a given photoelastic material, $b$ is a bias birefringence constant, $a$ is a forced-birefringence constant, $p$ and $q$ are the externally enforced principal stresses, and $r$ is the total relative retardation. The externally enforced principal stresses are, of course, directly related to deformation of the indicator or to deformation of an object to which the indicator is attached.

Relative retardation causes a phase shift between ordinary and extraordinary ray components so that when they are analyzed, made coplaner, destructive interference occurs at wave lengths of light for which the relative retardation has resulted in a phase difference of 180 degrees between the component rays. The subtraction of colors from ordinary light by this process results in predominance of a complementary color which is then an indication of relative retardation, stress difference, deformation, etc.

What is claimed is:

1. A laminated photoelastic strain indicator for use under normal room illumination and yielding a direct, visible, quantitative indication of the immediate strain field acting within an extended surface area of a prototype workpiece, said indicator comprising in combination a lamina of photoelastic material, a laminar polarizer-analyzer means polarizing light directed into said indicator and analyzing light directed out of said indicator substantially coextensive with said lamina, means superimposing said polarizer-analyzer means over and contiguous with one side of said lamina, bonding means in contact with the other side of said lamina unitarily bonding said lamina to the workpiece and imposing surface deformations of the workpiece upon said lamina, and reflector means parallel and coextensive with said lamina interposed between said lamina and the workpiece.

2. A laminated photoelastic strain indicator for use under normal room illumination and yielding a direct, visible, quantitative indication of the immediate strain field acting within an extended surface area of a prototype workpiece, said indicator comprising in combination a laminar polarizing means polarizing light directed into said indicator and analyzing light directed out of said indicator, a laminar photoelastic means producing along each transmitted light ray path through each incremental area thereof a relative retardation between ordinary and extraordinary light ray components equal to the sum of a first constant and the product of a second constant and any deformation-generated difference between principal stresses normal to said path, means bonding said indicator to the workpiece generating said difference directly proportional to surface deformation of the workpiece and reflector means interposed between said indicator and the workpiece.

3. The indicator of claim 2 wherein said polarizing means is a plane polarizer.

4. The indicator of claim 2 wherein said first constant is substantially equal to zero.

5. The indicator of claim 2 wherein the value of said first constant is predetermined to substantially restrict light transmitted through said incremental area and directed out of said indicator to a single hue when said difference is substantially equal to zero.

6. A laminated photoelastic strain indicator for use under normal room illumination and yielding a direct, visible, quantitative, point by point indication of the immediate strain field acting within an extended surface area of a prototype workpiece, said indicator comprising in combination a laminar circular polarizing means polarizing light directed into said indicator and analyzing light directed out of said indicator, a laminar photoelastic means producing along each transmitted light ray path through each incremental area thereof a relative retardation between ordinary and extraordinary light ray components equal to the sum of a first constant and the product of a second constant and any deformation-generated difference between principal stresses normal to said path, means bonding said indicator to the workpiece generating said difference directly proportional to surface deformation of the area of the workpiece subtended by said incremental area and reflector means interposed between said indicator and the workpiece.

7. The indicator of claim 6 wherein the value of said first constant is predetermined to substantially restrict light transmitted through said incremental area and directed out of said indicator to a single hue when said difference is substantially equal to zero.

References Cited in the file of this patent
UNITED STATES PATENTS

| | | |
|---|---|---|
| 2,174,269 | Land | Sept. 26, 1939 |
| 2,255,933 | Land | Sept. 16, 1941 |
| 2,625,850 | Stanton | Jan. 20, 1953 |
| 2,776,598 | Dreyer | Jan. 8, 1957 |
| 2,929,242 | Bell | Mar. 22, 1960 |